(12) United States Patent
Park et al.

(10) Patent No.: US 11,281,002 B2
(45) Date of Patent: *Mar. 22, 2022

(54) THREE-DIMENSIONAL DISPLAY APPARATUS

(71) Applicant: SAMSUNG ELECTRONICS CO., LTD., Suwon-si (KR)

(72) Inventors: Juyong Park, Seongnam-si (KR); Dong Kyung Nam, Yongin-si (KR); Kyuhwan Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/934,740

(22) Filed: Jul. 21, 2020

(65) Prior Publication Data

US 2020/0351483 A1 Nov. 5, 2020

Related U.S. Application Data

(63) Continuation of application No. 15/639,243, filed on Jun. 30, 2017, now Pat. No. 10,728,512.

(30) Foreign Application Priority Data

Nov. 25, 2016 (KR) .................. 10-2016-0158142

(51) Int. Cl.
*G02B 27/01* (2006.01)
*G02B 30/27* (2020.01)
(Continued)

(52) U.S. Cl.
CPC ......... *G02B 27/0101* (2013.01); *G02B 30/27* (2020.01); *G02B 30/30* (2020.01);
(Continued)

(58) Field of Classification Search
CPC .... H04N 13/117; H04N 13/305; H04N 13/32; H04N 13/383; H04N 13/31; H04N 13/30;
(Continued)

(56) References Cited

U.S. PATENT DOCUMENTS 5,754,344 A 5/1998 Fujiyama
9,578,303 B2 2/2017 Tsukagoshi
(Continued)

FOREIGN PATENT DOCUMENTS

CN 1426168 A 6/2003
CN 1607418 A 4/2005
(Continued)

OTHER PUBLICATIONS

Communication dated Jan. 5, 2021 by the National Intellectual Property Administration of P.R. China in Chinese Application No. 201710790127.1.
(Continued)

*Primary Examiner* — Alexander Gee
(74) *Attorney, Agent, or Firm* — Sughrue Mion, PLLC

(57) ABSTRACT

A three-dimensional (3D) display apparatus is provided. The 3D display apparatus includes a display panel configured to output pixel values that respectively correspond to a preset number of viewpoints, and an optical layer that is provided in front of or behind the display panel and that is configured to adjust directions of rays output from the display panel or to provide light to the display panel so that the rays diverge.

17 Claims, 11 Drawing Sheets

(51) Int. Cl.
  *G02B 30/30* (2020.01)
  *H04N 13/117* (2018.01)
  *H04N 13/305* (2018.01)
  *H04N 13/31* (2018.01)
  *H04N 13/32* (2018.01)
  *H04N 13/383* (2018.01)
  *G02B 17/08* (2006.01)
  *H04N 13/302* (2018.01)

(52) U.S. Cl.
  CPC ......... *H04N 13/117* (2018.05); *H04N 13/305* (2018.05); *H04N 13/31* (2018.05); *H04N 13/32* (2018.05); *H04N 13/383* (2018.05); *G02B 17/08* (2013.01)

(58) Field of Classification Search
  CPC .. H04N 13/302; H04N 13/312; H04N 13/315; H04N 13/317; H04N 13/327; H04N 13/332; H04N 13/349; G02B 27/0101; G02B 27/2214; G02B 27/225; G02B 17/08; G01S 7/20; G01S 7/52068
  See application file for complete search history.

(56) References Cited

U.S. PATENT DOCUMENTS

| | | |
|---|---|---|
| 2002/0118452 A1 | 8/2002 | Taniguchi |
| 2003/0114200 A1 | 6/2003 | Lee |
| 2007/0285338 A1 | 12/2007 | Yanagisawa |
| 2009/0309873 A1* | 12/2009 | Saishu ............... H04N 13/351 345/419 |
| 2011/0058252 A1 | 3/2011 | Janetopoulos |
| 2011/0075256 A1 | 3/2011 | De Zwart |
| 2011/0090419 A1 | 4/2011 | Yokoyama |
| 2011/0188116 A1 | 8/2011 | Ledentsov |
| 2012/0033298 A1 | 2/2012 | Hsiao |
| 2012/0050857 A1 | 3/2012 | Lee et al. |
| 2012/0120213 A1* | 5/2012 | Ohyama ............... H04N 13/324 348/60 |
| 2013/0039031 A1* | 2/2013 | Asano .................. G02B 5/3025 362/19 |
| 2013/0307831 A1 | 11/2013 | Robinson |
| 2013/0321595 A1 | 12/2013 | Saishu |
| 2013/0327791 A1 | 12/2013 | Runft et al. |
| 2014/0240559 A1* | 8/2014 | Ueno .................. G02B 13/001 348/294 |
| 2015/0062119 A1 | 3/2015 | Nakamura |
| 2015/0226965 A1 | 8/2015 | Kim |
| 2016/0073098 A1 | 3/2016 | Villalobos Martinez |
| 2016/0327791 A1 | 11/2016 | Kasano et al. |
| 2017/0023780 A1 | 1/2017 | Braker |

FOREIGN PATENT DOCUMENTS

| | | |
|---|---|---|
| CN | 101029975 A | 9/2007 |
| CN | 102053378 A | 5/2011 |
| CN | 102572477 A | 7/2012 |
| CN | 103616767 A | 3/2014 |
| DE | 10 2009 054 231 A1 | 5/2011 |
| GB | 2 405 519 A | 3/2005 |
| KR | 10-2012-0025282 A | 3/2012 |
| KR | 10-2012-0031400 A | 4/2012 |
| KR | 10-2013-0061042 A | 6/2013 |
| KR | 10-2016-0030768 A | 3/2016 |

OTHER PUBLICATIONS

Communication dated Mar. 29, 2018 by the European Patent Office in counterpart European Patent Application No. 17203447.2.
Communication dated Oct. 29, 2020 by the European Patent Office in European Patent Application No. 17203447.2.

* cited by examiner

THREE-DIMENSIONAL DISPLAY APPARATUS

CROSS-REFERENCE TO RELATED APPLICATION

This application is a Continuation of U.S. application Ser. No. 15/639,243, filed Jun. 30, 2017, which claims priority from Korean Patent Application No. 10-2016-0158142, filed on Nov. 25, 2016 in the Korean Intellectual Property Office, the disclosure of which is incorporated herein by reference in its entirety.

BACKGROUND

1. Field

Methods and apparatuses consistent with example embodiments relate to a three-dimensional (3D) display apparatus.

2. Description of the Related Art

The most dominant factor for recognizing a 3D image is a difference between respective images shown to the two eyes of a user. A scheme of displaying different images to both eyes of a user may include, for example, a glasses scheme and a glasses-free scheme. In the glasses scheme, filtering of a desired image may be performed by using polarized light division, time division or wavelength division for differentiating a wavelength of a primary color. In the glasses-free scheme, each image may be visible in a predetermined space using a 3D conversion apparatus, such as, for example, a parallax barrier, a lenticular lens, or a directional backlight unit (BLU). The glasses-free scheme may reduce an inconvenience of wearing glasses. For example, the above-described 3D image may be provided by an optical system, such as, for example, a mirror or a lens. In this example, a direction of light may be changed by the optical system, and accordingly a change in the direction of the light may be taken into consideration in rendering a 3D image.

SUMMARY

Example embodiments may address at least the above-described problems and/or disadvantages and other disadvantages not described above. Also, the example embodiments are not required to overcome the disadvantages described above, and an example embodiment may not overcome any of the problems described above.

According to an aspect of an example embodiment, there is provided a three-dimensional (3D) display apparatus which includes a display panel configured to output pixel values that correspond to a preset number of viewpoints, and an optical layer provided in front of the display panel and configured to adjust respective directions of rays output from the display panel so that the rays diverge.

A value that corresponds to a pitch between adjacent pairs of optical elements of the optical layer may be greater than a product of a number of viewpoints represented by a single optical element of the optical layer and a value that corresponds to a pitch between adjacent pairs of pixels of the display panel.

A pitch between adjacent pairs of optical elements of the optical layer may be determined based on a number of viewpoints represented by a single optical element of the optical layer, a pitch between adjacent pairs of pixels of the display panel, an optimum viewing distance and a gap between the display panel and the optical layer.

The optimum viewing distance may be determined based on a distance between the display panel and an optical image acquired by applying an optical transformation to a predetermined viewpoint of a user.

The optical layer may include one from among a parallax barrier and a lenticular lens.

A 3D image rendered by the rays may be observable by a catadioptric system.

The pixel values may be determined based on an optical image acquired by applying an optical transformation to a predetermined viewpoint of a user.

According to another aspect of an example embodiment, there is provided a 3D display apparatus which includes a display panel configured to output pixel values that correspond to a preset number of viewpoints, and an optical layer provided behind the display panel and configured to provide light to the display panel so that rays output from the display panel diverge.

A value that corresponds to a pitch between adjacent pairs of optical elements of the optical layer may be less than a product of a number of viewpoints represented by a single optical element of the optical layer and a value that corresponds to a pitch between adjacent pairs of pixels of the display panel.

The optical layer may be implemented as a directional backlight unit (BLU).

According to another aspect of an example embodiment, there is provided a method for designing a 3D display apparatus including a display panel and an optical layer, the method including determining parameters that include a pitch between adjacent pairs of pixels of the display panel, an optical viewing distance and a gap between the display panel and the optical layer, and determining a pitch between adjacent pairs of optical elements of the optical layer based on the determined parameters.

The determining of the pitch between the adjacent pairs of optical elements may include adjusting at least one of the parameters when the determining of the pitch between the optical elements based on the determined parameters is determined to be infeasible, and determining the pitch between the adjacent pairs of the optical elements based on the determined parameters and the at least one adjusted parameter.

When the optical layer is provided in front of the display panel, a value that corresponds to the pitch between the adjacent pairs of optical elements may be determined to be greater than a product of a number of viewpoints represented by a single optical element of the optical layer and a value that corresponds to the pitch between the adjacent pairs of the pixels of the display panel.

When the optical layer is provided behind the display panel, a value that corresponds to the pitch between the adjacent pairs of optical elements may be determined to be less than a product of a number of viewpoints represented by a single optical element of the optical layer and a value that corresponds to the pitch between the adjacent pairs of the pixels of the display panel.

BRIEF DESCRIPTION OF THE DRAWINGS

The above and other aspects of example embodiments will become apparent and more readily appreciated from the following detailed description of certain example embodiments, taken in conjunction with the accompanying drawings of which.

DETAILED DESCRIPTION

Figure 1:
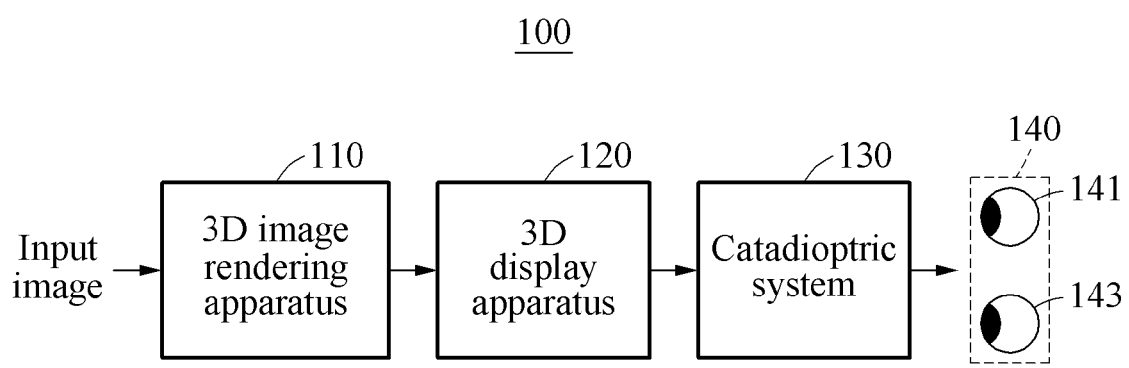
FIG. 1 is a diagram illustrating a three-dimensional (3D) image rendering system, according to an example embodiment.

The following structural or functional descriptions are exemplary to merely describe the example embodiments, and the scope of the example embodiments is not limited to the descriptions provided in the present specification. Various changes and modifications may be made thereto by persons having ordinary skill in the art.

Although terms such as "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right, according to the concept of the present disclosure.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, example embodiments will be described in detail with reference to the accompanying drawings, and like reference numerals in the drawings refer to like elements throughout.

FIG. 1 is a diagram illustrating a three-dimensional (3D) image rendering system 100, according to an example embodiment. Referring to FIG. 1, the 3D image rendering system 100 includes a 3D image rendering apparatus 110, a 3D display apparatus 120, and a catadioptric system 130.

The 3D display apparatus 120 may include a display panel and an optical layer. The optical layer may include, for example, one from among a parallax barrier, a lenticular lens and a directional backlight unit (BLU) (also referred to herein as a "directional backlight device"). The display panel may include a plurality of pixels, and the 3D image rendering apparatus 110 may assign pixel values that respectively correspond to a preset number of viewpoints to the plurality of pixels based on an input image. For example, the 3D image rendering apparatus 110 may assign a pixel value that corresponds to a first viewpoint 141 to a first pixel, and may assign a pixel value that corresponds to a second viewpoint 143 to a second pixel. In the following description, the first viewpoint 141 and the second viewpoint 143 may be referred to as "candidate viewpoints." Depending on example embodiments, the candidate viewpoints may include a left viewpoint and a right viewpoint for a single user, or may include a preset number of viewpoints for multiple views. The display panel may display a panel image based on pixel values to be assigned by the 3D image rendering apparatus 110.

Light emitted by a light source may be provided to the pixels of the display panel. The light source may include, for example, a BLU disposed behind the display panel or a directional BLU that is an example of the optical layer. For example, when light is provided to the pixels, light that corresponds to pixel values of the pixels may be visible to a user. In this example, the optical layer may limit a direction in which the light is visible to the user. For example, a parallax barrier may output light in a limited direction through slits arranged at regular intervals, and a lenticular lens may output light in a limited direction through a curve of the lenticular lens. Also, a directional BLU may provide light in a limited direction to the display panel.

For example, light that propagates in a direction of the first viewpoint 141 may be provided to a pixel to which the pixel value that corresponds to the first viewpoint 141 is assigned, and light that propagates in a direction of the second viewpoint 143 may be provided to a pixel to which the pixel value that corresponds to the second viewpoint 143 is assigned. A user in a viewing zone 140 may view an image that corresponds to the first viewpoint 141 at the first viewpoint 141, and may view an image that corresponds to the second viewpoint 143 at the second viewpoint 143. When the first viewpoint 141 and the second viewpoint 143 respectively correspond to a right eye and a left eye of a user, the user may feel a 3D effect while viewing different images with the eyes.

An image output by the 3D display apparatus 120 may be provided to a user via the catadioptric system 130. The catadioptric system 130 may include a mirror that corresponds to a reflecting optical system, and/or a lens that corresponds to a refracting optical system. The 3D display apparatus 120 may be implemented by a small screen, and the catadioptric system 130 may be configured to magnify an image output by the 3D display apparatus 120. For example, the 3D display apparatus 120 and the catadioptric system 130 may be implemented as a portion of a head-up display (HUD) installed in a vehicle. In this example, the catadioptric system 130 may include a semitransparent concave mirror.

To assign a pixel value to a pixel of the display panel, the 3D image rendering apparatus 110 may analyze a path of light that propagates through the pixel. In the following description, light that propagates through a pixel of the display panel may be referred to as a "ray." For example, when a ray that propagates through a first pixel is provided to the first viewpoint 141, the 3D image rendering apparatus 110 may assign a pixel value that corresponds to the first viewpoint 141 to the first pixel.

A path of a ray output by the 3D display apparatus 120 may be altered by the catadioptric system 130. The 3D image rendering apparatus 110 may analyze a path of a ray output by the 3D display apparatus 120 based on influences caused by the 3D display apparatus 120 and the catadioptric system 130. For example, the catadioptric system 130 may change the path of the ray, in order to magnify an object.

The 3D image rendering apparatus 110 may assign a pixel value based on an influence on a ray caused by the catadioptric system 130. To assign a pixel value based on the first viewpoint 141 and the second viewpoint 143 and an optical image that corresponds to an image that is output by the 3D display apparatus 120 and that is altered by the catadioptric system 130, a complex operation may be required. The 3D image rendering apparatus 110 may determine optical images that correspond to the first viewpoint 141 and the second viewpoint 143 based on the catadioptric system 130, and may assign a pixel value based on the optical images and the image output by the 3D display apparatus 120, which will be further described below. The image output by the 3D display apparatus 120 may be an image that is not affected by the catadioptric system 130. Accordingly, the influence on the ray caused by the catadioptric system 130 may be reflected with a relatively small amount of calculation.

In an example, the 3D image rendering apparatus 110 may compare directions of rays output by the 3D display apparatus 120 and positions of the optical images that correspond to the first viewpoint 141 and the second viewpoint 143, and may directly determine a viewpoint that corresponds to a pixel. For example, when a first ray is mapped near the optical image that corresponds to the first viewpoint 141, the 3D image rendering apparatus 110 may assign a pixel value that corresponds to the first viewpoint 141 to a pixel that outputs the first ray.

In another example, the 3D image rendering apparatus 110 may indirectly determine a viewpoint that corresponds to a pixel based on a distance an optical element and virtual rays that are based on the optical images that corresponds to the first viewpoint 141 and the second viewpoint 143. The optical element may refer to an element (for example, a slit of a parallax barrier or a curve of a lenticular lens) configured to transmit light that travels in a limited direction, or refer to a light source of a directional BLU configured to provide light that travels in a limited direction. For example, the 3D image rendering apparatus 110 may determine a first virtual ray that propagates through a predetermined pixel and the optical image that corresponds to the first viewpoint 141, and a second virtual ray that propagates through the predetermined pixel and the optical image that corresponds to the second viewpoint 143. In this example, when a distance between the first virtual ray and an optical element adjacent to the first virtual ray is less than a distance between the second virtual ray and an optical element adjacent to the second virtual ray, the 3D image rendering apparatus 110 may assign a pixel value that corresponds to the first viewpoint 141 to the pixel.

To increase a quality of a 3D image, rays that are output by the 3D display apparatus 120 and that are altered by the catadioptric system 130 may need to be concentrated on the viewing zone 140. For example, when the rays are concentrated on the first viewpoint 141 and the second viewpoint 143, a quality of a 3D image observed at an optimum viewing distance may be enhanced. Accordingly, the 3D display apparatus 120 may be designed to output the rays concentrated on the first viewpoint 141 and the second viewpoint 143, based on an influence caused by the catadioptric system 130.

Figure 2A:
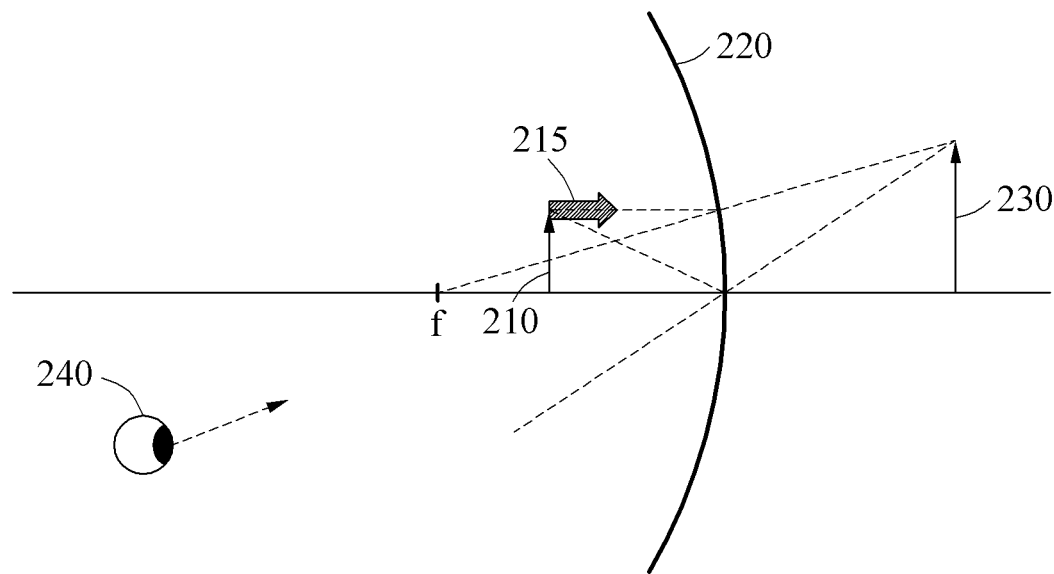
FIGS. 2A and 2B are diagrams illustrating examples of a process of rendering a 3D image by using a concave mirror, according to an example embodiment.
Figure 2B:
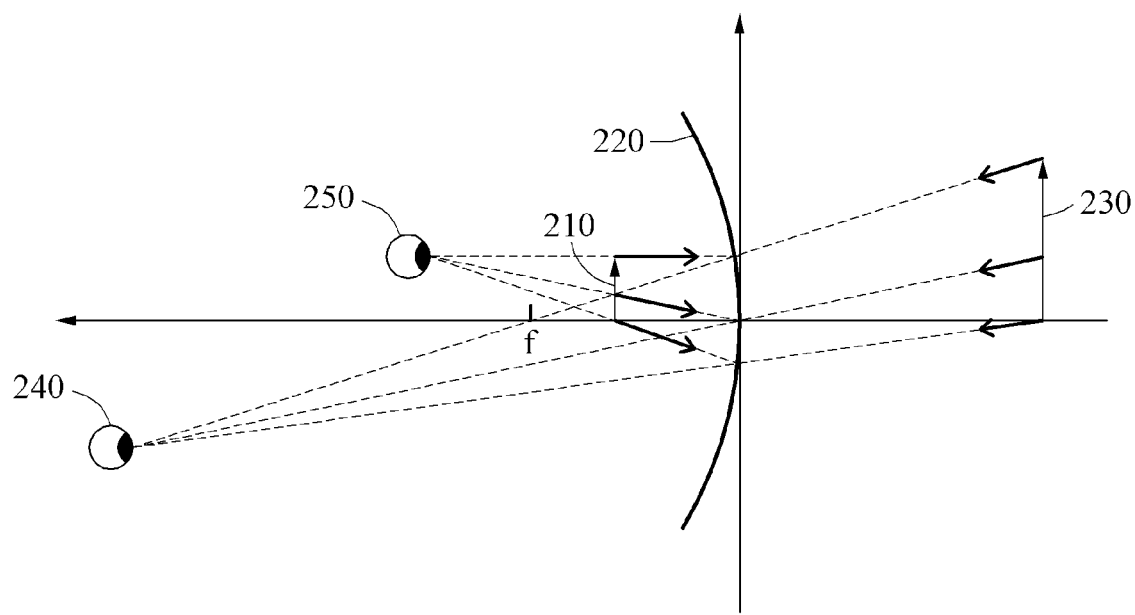

FIGS. 2A and 2B illustrate examples of a process of rendering a 3D image by using a concave mirror, according to an example embodiment. FIG. 2A illustrates an object 210 displayed on a 3D display apparatus, a concave mirror 220, an optical image 230 representing the object 210, and a viewpoint 240.

The object 210 may be output by the 3D display apparatus. Accordingly, a position of the object 210 may correspond to a position of the 3D display apparatus. The optical image 230 may be determined by applying an optical transformation to the object 210. The optical transformation may be performed based on an optical characteristic of the concave mirror 220 that includes a focal point f that corresponds to a curve. The concave mirror 220 may correspond to the catadioptric system 130 of FIG. 1. Also, a single concave mirror is illustrated in FIGS. 2A and 2B, however, there is no limitation thereto. For example, various optical systems for generating a similar optical effect to that of a single concave mirror may be used instead of the concave mirror.

The 3D display apparatus may represent the object 210 by using rays output in a direction 215 of the 3D display apparatus. Rays output by the 3D display apparatus may be reflected from the concave mirror 220 and may be propagated to the viewpoint 240. The object 210 may be rendered to form the optical image 230 through the concave mirror 220, and a user may observe the optical image 230 by using the concave mirror 220 instead of the object 210 displayed on the 3D display apparatus.

Forming of a direction in which rays output from a plurality of points converge in comparison to parallel light may be referred to as "convergence of rays," and forming of directions in which rays output from a plurality of points diverge in comparison to parallel light may be referred to as "divergence of rays." A quality of a 3D image may increase when a number of rays that reach a viewing zone increases. Thus, to enhance the quality of the 3D image, rays traveling from the optical image 230 to the viewpoint 240 may need to converge.

Referring to FIG. 2B, when rays output from the object 210 towards the concave mirror 220 (for example, rays output in a forward direction with respect to the 3D display apparatus) diverge, rays traveling from the optical image 230 towards the viewpoint 240 may converge. Accordingly, the 3D display apparatus may be designed to cause output rays to diverge in the forward direction of the 3D display apparatus.

Parameters of the 3D display apparatus may include, for example, a pitch between optical elements of an optical layer, a number of viewpoints represented by a single optical element of the optical layer, a pitch between pixels of a display panel, an optimum viewing distance and a gap between the display panel and the optical layer. The parameters of the 3D display apparatus may be determined so that rays output by the 3D display apparatus may diverge.

In an example, when the optical layer includes a parallax barrier or a lenticular lens, the optical layer may adjust respective directions of rays output from the display panel so that the rays may diverge. In another example, when the optical layer is implemented as a directional BLU, the optical layer may provide light to the display panel so that respective rays output from the display panel may diverge.

In an example, when the optical layer includes a parallax barrier or a lenticular lens disposed in front of the display panel, a value that corresponds to a pitch between optical elements of the optical layer may be determined to be greater than a product of a number of viewpoints represented by a single optical element of the optical layer and a value that corresponds to a pitch between pixels of the display panel. In another example, when the optical layer is implemented as a directional BLU disposed behind the display panel, a value that corresponds to the pitch between the optical elements may be determined to be less than the product of the number of the viewpoints represented by the single optical element and a value that corresponds to the pitch between the pixels. Based on the above parameters, the 3D display apparatus may output rays that diverge.

As described above, based on the optical characteristic of the concave mirror 220, a position of an optical image 250 associated with the viewpoint 240 may be determined. When a 3D image is rendered, a positional relationship between the optical image 230 and the viewpoint 240 may be substituted with a positional relationship between the object 210 and the optical image 250. A position of the optical image 250 may be in a direction that is opposite to the forward direction of the 3D display apparatus based on the object 210. Accordingly, the 3D display apparatus may be designed so that rays traveling in the direction opposite to the forward direction of the 3D display apparatus may converge toward the optical image 250 when rays that are propagating in the forward direction diverge.

Figure 3:
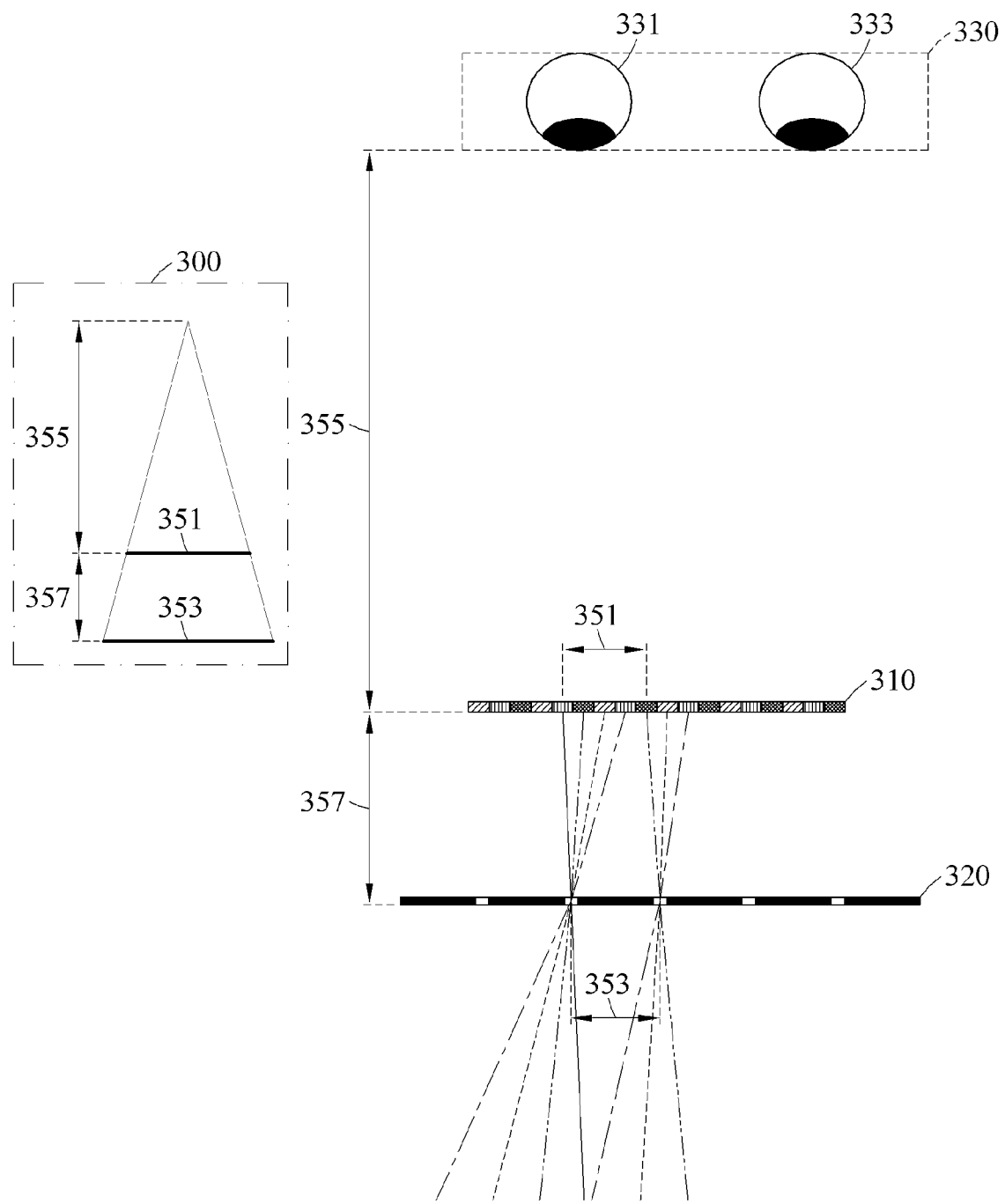
FIG. 3 is a diagram illustrating a 3D display apparatus, according to an example embodiment.

FIG. 3 is a diagram illustrating an example of a 3D display apparatus, according to an example embodiment. Referring to FIG. 3, the 3D display apparatus includes a display panel 310 and an optical layer 320. The optical layer 320 is disposed in front of the display panel 310 and may correspond to, for example, a parallax barrier.

The display panel 310 may output pixel values that correspond to a preset number of viewpoints. Rays that respectively to the pixel values of the display panel 310 may be output by light provided to the display panel 310. The optical layer 320 may adjust respective directions of rays output from the display panel 310 so that the rays may diverge. Parameters of the 3D display apparatus may include, for example, a number of viewpoints represented by a single optical element, a pitch between pixels, a pitch 353 between adjacent pairs of optical elements, an optimum viewing distance 355 and a gap 357 between the display panel 310 and the optical layer 320. A pixel range 351 that corresponds to a single optical element may be determined by a product of a number of viewpoints represented by a single optical element and a pitch between adjacent pairs of pixels.

Rays output from the 3D display apparatus may need to diverge in a form of a triangle in a box 300. Equation 1 may be obtained based on a proportional relationship between line segments of the triangle. A relationship between the parameters of the 3D display apparatus may be expressible based on Equation 1 provided below, and thus the rays output from the 3D display apparatus may diverge.

$$\frac{P_{opt}}{NP_{pix}} = 1 + \frac{d_{gap}}{d_{view}} \quad \text{[Equation 1]}$$

In Equation 1, $P_{opt}$ denotes the pitch 353, N denotes the number of the viewpoints represented by the single optical element, $P_{pix}$ denotes the pitch between the adjacent pairs of pixels, $d_{view}$ denotes the optimum viewing distance 355, and $d_{gap}$ denotes the gap 357. $P_{opt}$ may be determined based on the other parameters. Because both $d_{gap}$ and $d_{view}$ are positive numbers, $d_{gap}/d_{view}$ may be a positive number. Accordingly, based on Equation 1, $P_{opt}$ may be determined to be greater than $NP_{pix}$. Also, because $d_{gap}$ may be significantly less than $d_{view}$, $d_{gap}/d_{view}$ may be an extremely small positive number. Accordingly, $P_{opt}$ may be determined to be greater than $NP_{pix}$ by a product of $NP_{pix}$ and $d_{gap}/d_{view}$.

As described above, N denotes the number of the viewpoints represented by the single optical element in Equation 1. In FIG. 3, four viewpoints may be represented by a single optical element, and accordingly N may be equal to "4" and the pixel range 351 may be determined to be four times the pitch between the adjacent pairs of pixels. Also, in FIG. 3, pixels included in the pixel range 351 may be assumed to output rays that respectively correspond to different viewpoints. For example, when a plurality of pixels for the same viewpoints correspond to a single optical element, N may be defined as a number of pixels that emit rays to a single optical element.

Figure 4:
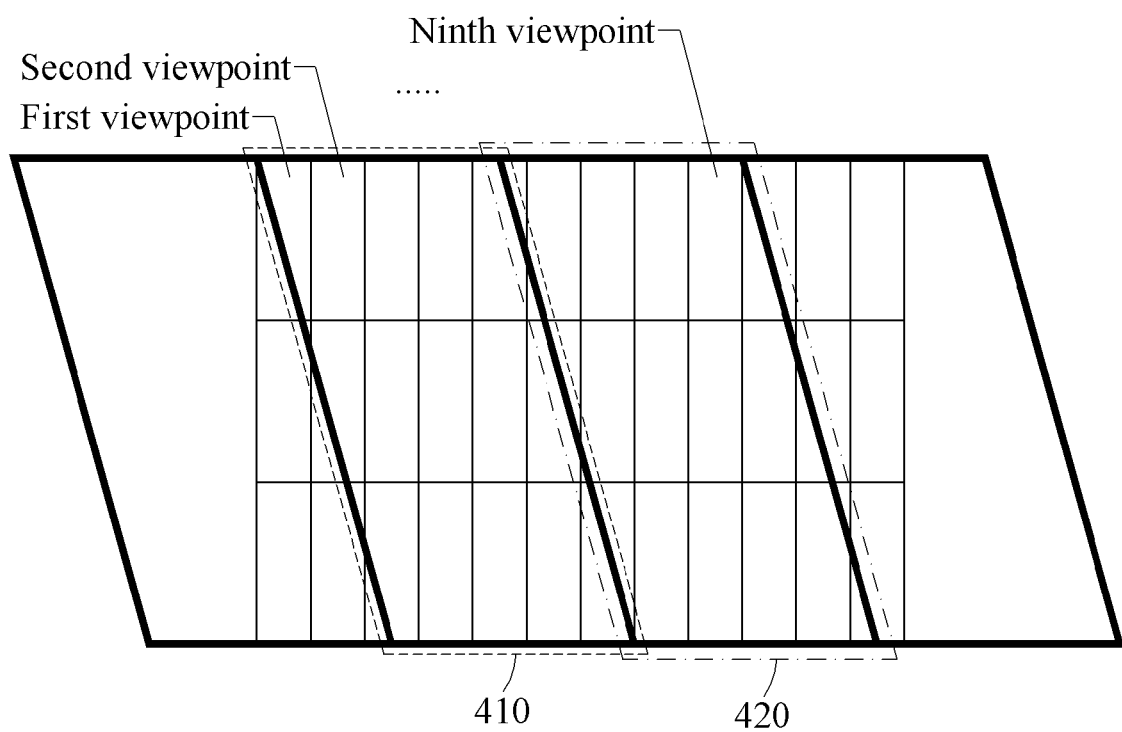
FIG. 4 is a diagram illustrating a number of viewpoints represented by optical elements, according to an example embodiment.

Also, N may be a rational number. For example, when M pixels are covered by L optical elements, N may be represented as M/L. FIG. 4 is a diagram illustrating a number of viewpoints represented by optical elements, according to an example embodiment. Referring to FIG. 4, a first viewpoint through a ninth viewpoint are represented by optical elements 410 and 420. In FIG. 4, N may be equal to "4.5."

Referring back to FIG. 3, the optimum viewing distance 355 may be determined based on the display panel 310 and an optimum viewing zone 330. The optimum viewing zone 330 may include viewpoints 331 and 333. The viewpoints 331 and 333 may correspond to optical images associated with actual viewpoints, which will be further described below. Directions in which rays output from the 3D display apparatus propagate may be changed by a catadioptric system. Accordingly, an influence caused by the catadioptric system may need to be considered in determining of a viewpoint that corresponds to a pixel of a display panel. The 3D image rendering apparatus may assign a pixel value to a pixel of the display panel based on an optical image acquired by applying an optical transformation to an actual viewpoint or a predetermined viewpoint, regardless of an influence on all pixels of the display panel caused by the catadioptric system. Thus, the optimum viewing distance 355 may be determined based on a distance between the display panel and an optical image acquired by applying an optical transformation to an actual viewpoint or predetermined viewpoint of a user.

The parameters of the 3D display apparatus may be determined by a design apparatus (not shown) in a process of designing the 3D display apparatus. The design apparatus may determine the parameters in an order of an ease of a design of the 3D display apparatus. For example, the design apparatus may determine parameters including $P_{pix}$, $d_{view}$, $d_{gap}$ and N, and may determine $P_{opt}$ based on the determined parameters. The design apparatus may determine a resolution of the display panel and may design the display panel based on the determined resolution. $P_{pix}$ may be determined by a pitch between adjacent pairs of pixels of the designed display panel.

Also, the design apparatus may determine $d_{view}$ based on a characteristic of an application to which the 3D display apparatus is applicable. As an example, when the 3D display apparatus is an application to be applied to a vehicle, $d_{view}$ may be determined based on an interior space of the vehicle. As another example, when the 3D display apparatus is an application to be applied to general home, $d_{view}$ may be determined based on an interior space of the home. The design apparatus may determine an optical image associated with an actual viewpoint or a predetermined viewpoint based on a catadioptric system, and may determine a distance between the optical image and the display panel as $d_{view}$.

In addition, the design apparatus may determine N based on a characteristic of an application to which the 3D display apparatus is applicable. In an example, when the 3D display apparatus is an application for a single user of a vehicle, N may be determined to be equal to "4.5." In another example, when the 3D display apparatus is an application for a plurality of users, N may be determined to be greater than "4.5." Also, the design apparatus may determine $d_{gap}$ based on, for example, a minimum 3D viewing angle that accounts for a viewing zone and a thickness of the 3D display apparatus. When parameters other than $P_{opt}$ are determined, the design apparatus may determine $P_{opt}$ based on the determined parameters and Equation 1.

The design apparatus may determine the parameters based on a feasibility of the parameters via the above-described process. For example, the design apparatus may determine whether the 3D display apparatus is to be actually implemented by using a relationship between the determined parameters.

When it is impossible to determine at least one parameter based on the other determined parameters (or when at least one parameter has an infeasible value), the design apparatus may adjust at least one of parameters other than the at least one parameter. For example, when it is impossible to determine $d_{gap}$ based on determined parameters, the design apparatus may adjust N among parameters other than $d_{gap}$ to have another value. In this example, the design apparatus may determine $d_{gap}$ based on the determined parameters and the adjusted N.

For example, $P_{opt}$ may be determined last among parameters, or parameters other than $P_{opt}$ may be adjusted for feasibility, and thus a process of designing the 3D display apparatus may be efficiently performed.

Figure 5:
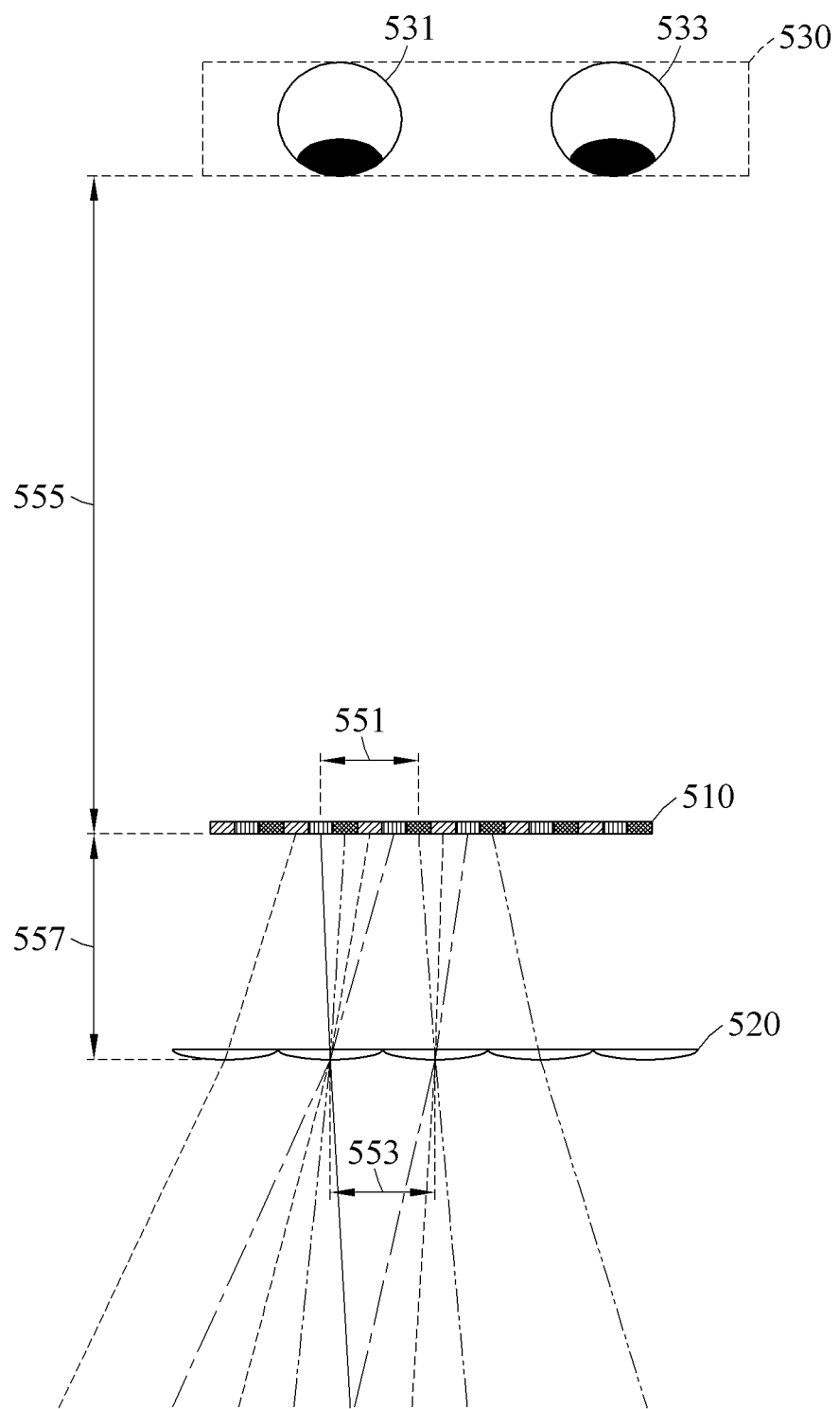
FIG. 5 is a diagram illustrating another example of a 3D display apparatus, according to an example embodiment.

FIG. 5 is a diagram illustrating another example of a 3D display apparatus, according to an example embodiment. Referring to FIG. 5, the 3D display apparatus includes a display panel 510 and an optical layer 520. The optical layer 520 is disposed in front of the display panel 510 and may correspond to, for example, a lenticular lens. In FIG. 5, the lenticular lens may be used instead of the parallax barrier of FIG. 3.

The display panel 510 may output pixel values that correspond to a preset number of viewpoints. Rays that correspond to the pixel values of the display panel 510 may be output by light provided to the display panel 510. The optical layer 520 may adjust respective directions of rays output from the display panel 510 so that the rays may diverge while traveling forward. Parameters of the 3D display apparatus may include, for example, a number of viewpoints represented by a single optical element, a pitch between adjacent pairs of pixels, a pitch 553 between adjacent pairs of optical elements, an optimum viewing distance 555 and a gap 557 between the display panel 510 and the optical layer 520. A pixel range 551 that corresponds to a single optical element may be determined by a product of a number of viewpoints represented by a single optical element and a value that corresponds to a pitch between adjacent pairs of pixels. The optimum viewing distance 555 may be determined based on the display panel 510 and an optimum viewing zone 530. Viewpoints 531 and 533 included in the optimum viewing zone 530 may correspond to optical images associated with actual or predetermined viewpoints. As described above with reference to FIG. 3, the parameters of the 3D display apparatus may be determined based on Equation 1.

Figure 6:
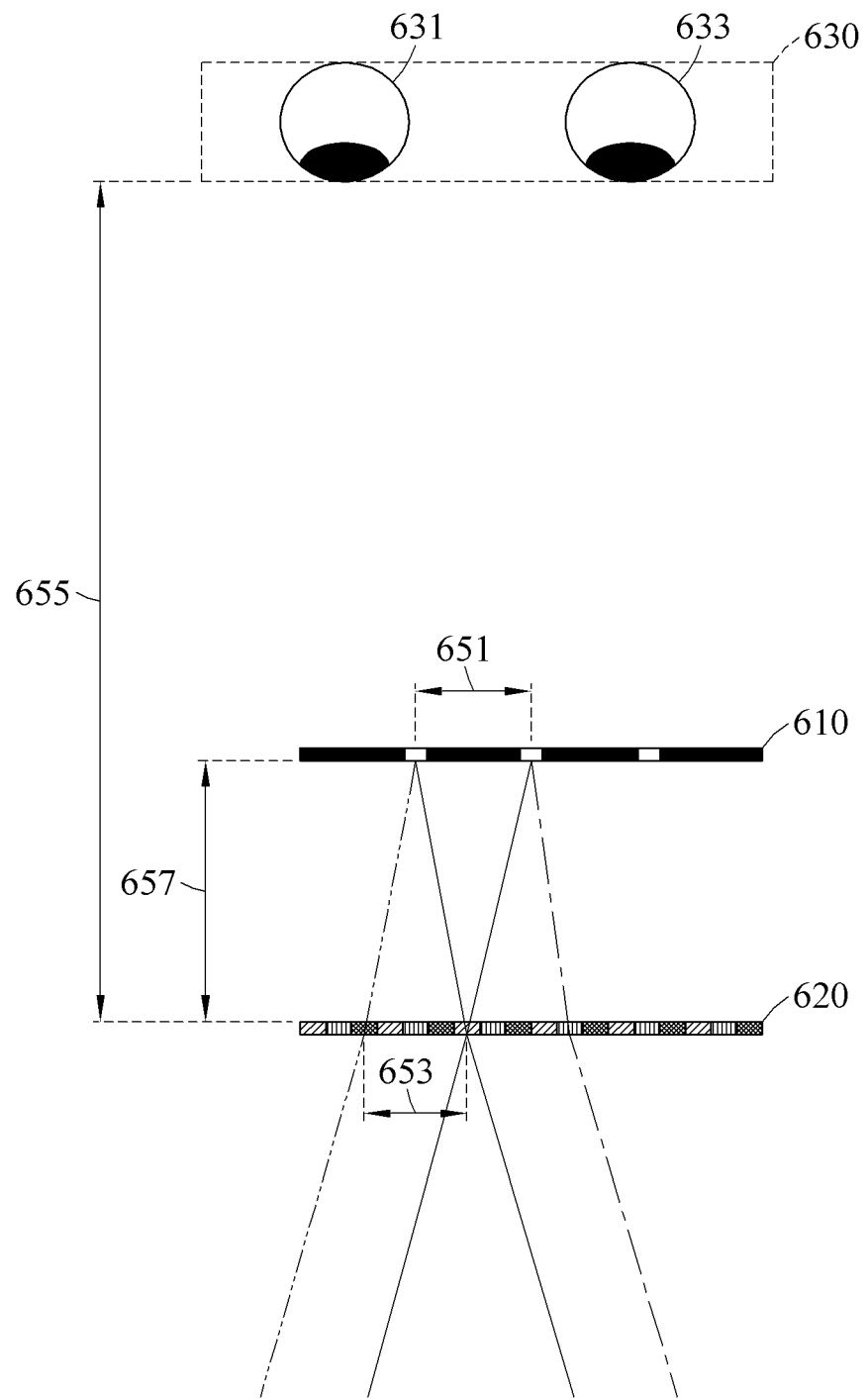
FIG. 6 is a diagram illustrating still another example of a 3D display apparatus, according to an example embodiment.

FIG. 6 is a diagram illustrating still another example of a 3D display apparatus, according to an example embodiment. Referring to FIG. 6, a 3D display apparatus includes an optical layer 610 and a display panel 620. The optical layer 610 is disposed behind the display panel 620 and may correspond to, for example, a directional BLU.

The display panel 620 may output pixel values that correspond to a preset number of viewpoints. The optical layer 610 may provide light to the display panel 620 so that rays output from the display panel 620 may diverge while traveling forward. Parameters of the 3D display apparatus may include, for example, a number of viewpoints represented by a single optical element, a pitch between adjacent pairs of pixels, a pitch 651 between adjacent pairs of optical elements, an optimum viewing distance 655 and a gap 657 between the display panel 620 and the optical layer 610. A pixel range 653 that corresponds to a single optical element may be determined by a product of a number of viewpoints represented by a single optical element and a pitch between adjacent pairs of pixels. The optimum viewing distance 655 may be determined based on the display panel 620 and an optimum viewing zone 630. Viewpoints 631 and 633 included in the optimum viewing zone 630 may correspond to optical images associated with actual or predetermined viewpoints. For divergence of rays output from the 3D display apparatus, a relationship between the parameters of the 3D display apparatus may be expressible based on Equation 2 shown below.

$$\frac{P_{opt}}{NP_{pix}} = 1 - \frac{d_{gap}}{d_{view}} \quad \text{[Equation 2]}$$

In Equation 2, $P_{opt}$ denotes the pitch 651, N denotes the number of the viewpoints represented by the single optical element, $P_{pix}$ denotes the pitch between the adjacent pairs of pixels, $d_{view}$ denotes the optimum viewing distance 655, and $d_{gap}$ denotes the gap 657. $P_{opt}$ may be determined based on the other parameters. Because both $d_{gap}$ and $d_{view}$ are positive numbers, $d_{gap}/d_{view}$ may be a positive number. Accordingly, based on Equation 2, $P_{opt}$ may be determined to be less than $NP_{pix}$. Also, because $d_{gap}$ may be significantly less than $d_{view}$, $d_{gap}/d_{view}$ may be an extremely small positive number. Accordingly, $P_{opt}$ may be determined to be less than $NP_{pix}$ by a product of $NP_{pix}$ and $d_{gap}/d_{view}$. Based on the above parameters, the 3D display apparatus may output rays that diverge.

Figure 7:
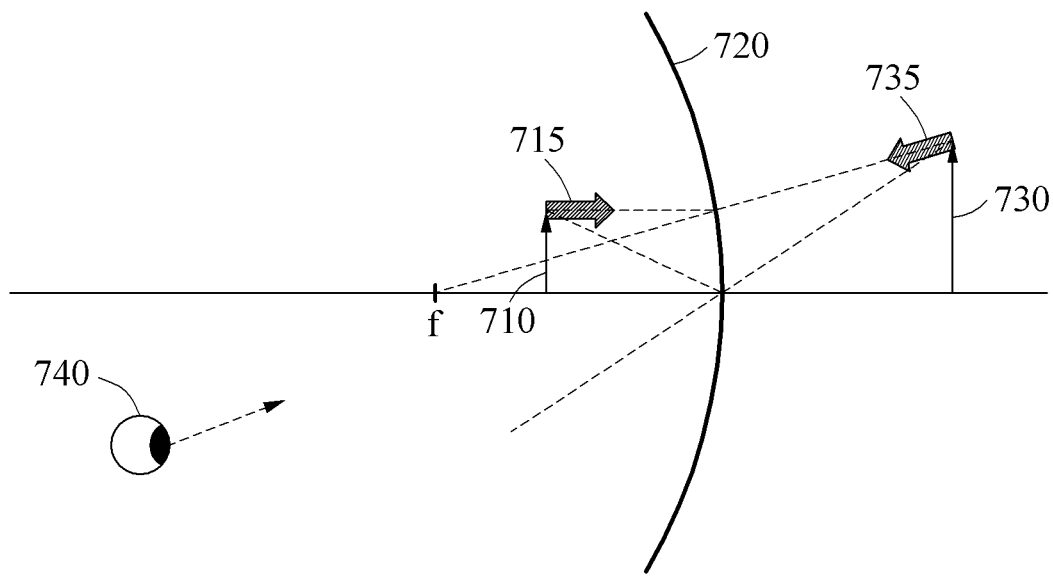
FIG. 7 is a diagram illustrating a change in light implemented by an optical system, according to an example embodiment.

FIG. 7 is a diagram illustrating a change in light by an optical system, according to an example embodiment. FIG.

7 illustrates an object 710 displayed on a 3D display apparatus, a concave mirror 720, an optical image 730 representing the object 710, and an actual viewpoint 740. A user may observe the optical image 730 at the actual viewpoint 740. The 3D display apparatus may output an image that represents the object 710 in a forward direction 715 of the 3D display apparatus, and a user may observe the optical image 730 in a direction 735 from the optical image 730 to the actual viewpoint 740. Accordingly, an influence caused by the concave mirror 720 may need to be considered in making a determination of a viewpoint that corresponds to a pixel of a display panel. A 3D image rendering apparatus may apply an optical transformation to the actual viewpoint 740 and may assign a pixel value to a pixel of the display panel in a relationship between the object 710 and an optical image acquired by the optical transformation, regardless of an influence on all pixels of the display panel caused by the concave mirror 720.

Figure 8:
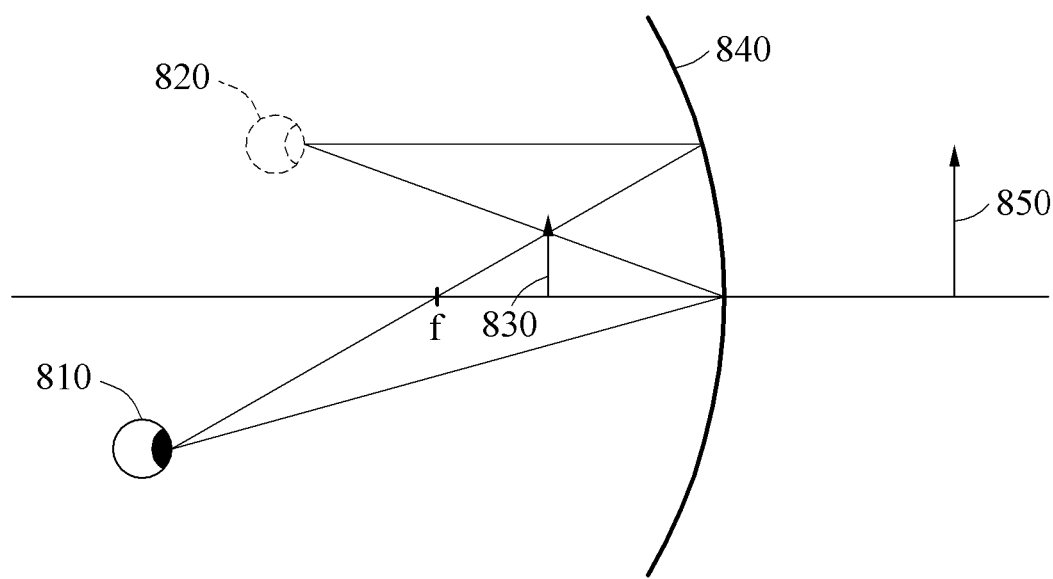
FIG. 8 is a diagram illustrating an optical image associated with an actual viewpoint, according to an example embodiment.

FIG. 8 is a diagram illustrating an optical image associated with an actual viewpoint, according to an example embodiment. FIG. 8 illustrates an optical image 820 associated with an actual viewpoint 810. A 3D image rendering apparatus may determine a position of the actual viewpoint 810 based on a viewpoint tracking scheme using a separate camera, and may determine a position of the optical image 820 by applying an optical transformation to the position of the actual viewpoint 810. Similarly to an optical image 850, the optical image 820 may be determined by an optical transformation based on an optical characteristic of a concave mirror 840. Accordingly, an optical relationship between the actual viewpoint 810 and the optical image 850 may correspond to an optical relationship between the optical image 820 and an object 830. For example, the 3D image rendering apparatus may assign a pixel value to a pixel of a display panel by using the optical image 820 and the object 830 instead of using the actual viewpoint 810 and the optical image 850. In this example, the 3D image rendering apparatus may determine a viewpoint that corresponds to the pixel of the display panel based on the optical image 820, instead of applying the optical transformation to pixels of the display panel. Thus, in consideration of an influence of the concave mirror 840, an amount of calculation may be reduced.

Figure 9:
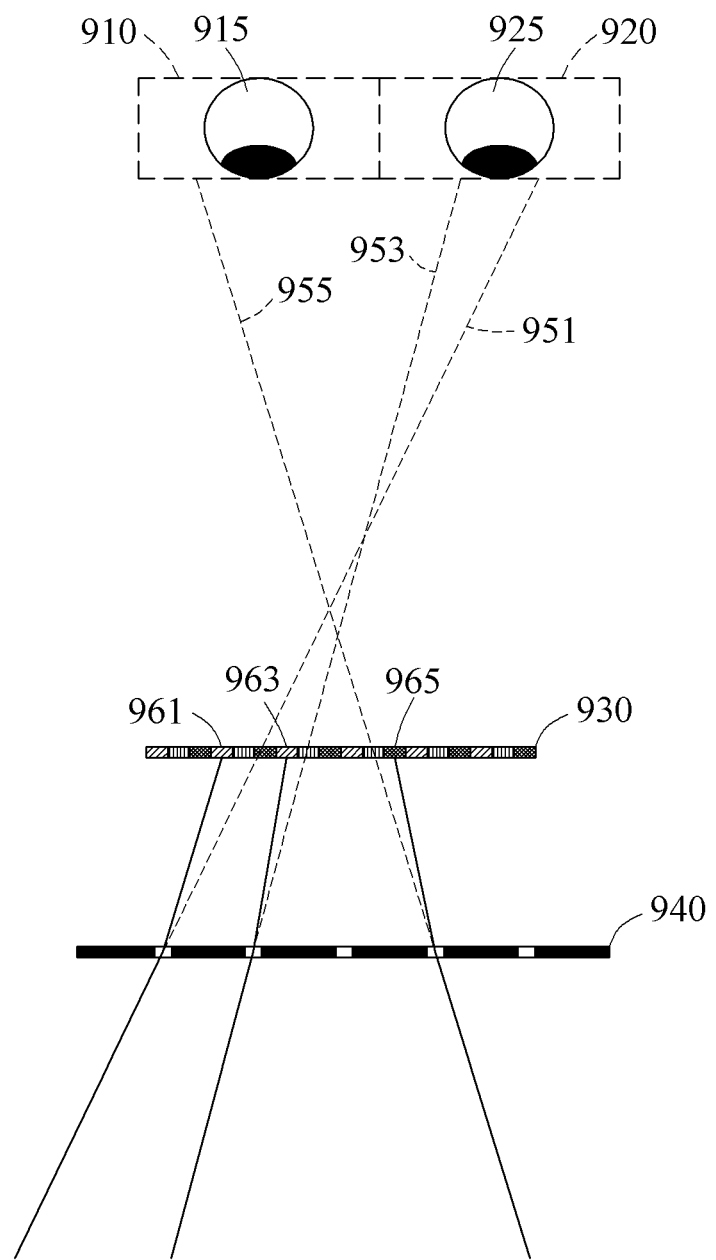
FIG. 9 is a diagram illustrating a process of calculating a direction of a ray and assigning a viewpoint, according to an example embodiment.

FIG. 9 is a diagram illustrating a process of calculating a direction of a ray and assigning a viewpoint, according to an example embodiment. In FIG. 9, rays pass through optical elements of an optical layer 940 and pixels of a display panel 930.

As described above, a 3D image rendering apparatus may compare directions of rays and positions of optical images 915 and 925, and may directly determine viewpoints that correspond to pixels 961, 963 and 965. The 3D image rendering apparatus may determine rays that pass through pixels of the display panel 930 and optical elements of the optical layer 940, and may determine viewpoints that correspond to the pixels of the display panel 930 based on directions of the rays and the positions of the optical images 915 and 925. The optical images 915 and 925 may be determined by applying an optical transformation to candidate viewpoints. For example, the optical image 915 may be determined by applying an optical transformation to a first viewpoint, and the optical image 925 may be determined by applying an optical transformation to a second viewpoint. The optical images 915 and 925 may be located behind the optical layer 940 and the display panel 930. Viewing zones 910 and 920 with a predetermined size may include the optical images 915 and 925, respectively. The viewing zones 910 and 920 may be defined based on the positions of the optical images 915 and 925.

The 3D image rendering apparatus may compare the directions of the rays and the positions of the optical images 915 and 925 based on reference lines. The reference lines may be determined based on refraction directions of the rays. For example, the 3D image rendering apparatus may determine reference lines 951, 953 and 955 based on rays that pass through the pixels 961, 963 and 965. As described above, a refractive index of a medium that is disposed between the optical layer 940 and the display panel 930 may be different from a refractive index of a medium that is disposed outside a 3D display apparatus, and accordingly rays may be refracted towards a medium with a relatively high refractive index when passing through the display panel 930. In the following description, a refraction direction of a ray may refer to a direction in which the ray is refracted and travels. A reference line may be determined as a line drawn in a direction opposite to the refraction direction of the ray.

The 3D image rendering apparatus may compare the reference lines 951, 953 and 955 and the positions of the optical images 915 and 925. For example, the 3D image rendering apparatus may compare the reference lines 951, 953 and 955 and the positions of the optical images 915 and 925 based on the viewing zones 910 and 920. The reference line 955 may intersect the viewing zone 910, and the reference line 951 and 953 may pass through the viewing zone 920. Accordingly, the 3D image rendering apparatus may assign a pixel value of a viewpoint that corresponds to the optical image 915 to the pixel 965 that corresponds to the reference line 955, and may assign a pixel value of a viewpoint that corresponds to the optical image 925 to the pixels 961 and 963 that respectively correspond to the reference lines 951 and 953.

For example, at least two rays among rays output from a single pixel may pass through the viewing zones 910 and 920. In this example, the 3D image rendering apparatus may select a single candidate ray from at least two candidate rays that pass through the viewing zones 910 and 920 based on a predetermined condition. In an example, the 3D image rendering apparatus may select a single ray that is relatively close to a center of the viewing zones 910 and 920 from at least two rays that pass through the viewing zones 910 and 920. The center of the viewing zones 910 and 920 may be in a boundary between the viewing zones 910 and 920. In another example, the 3D image rendering apparatus may select a single ray that is relatively close to a center of each of the viewing zones 910 and 920 from at least two rays that pass through the viewing zones 910 and 920. For example, when a first ray that passes through a first pixel passes through a center of the viewing zone 910 and when a second ray that passes through the first pixel passes through the viewing zone 920 out of a center of the viewing zone 920, the 3D image rendering apparatus may select the first ray.

For example, all rays output from a second pixel may not pass through the viewing zones 910 and 920. In this example, the 3D image rendering apparatus may assign a pixel value to the second pixel based on a predetermined condition. In an example, the 3D image rendering apparatus may assign, to the second pixel, a lowest pixel value in a predetermined range. Pixel values may range, for example, from "0" to "255." For example, when all the rays output from the second pixel do not pass through the viewing zones 910 and 920, the 3D image rendering apparatus may assign a pixel value of "0" to the second pixel. In another example, the 3D image rendering apparatus may assign, to the second pixel, a pixel value that corresponds to a viewpoint of the closest viewing zone to rays output from the second pixel among viewpoints of the viewing zones 910 and 920. For example, when a distance between a first ray and the viewing zone 910 is less than a distance between a second ray and the viewing zone 920 even though both the first ray and the second ray do not pass through the viewing zone 910, the 3D image rendering apparatus may assign a pixel value that corresponds to a viewpoint of the viewing zone 910 to the second pixel.

The optical images 915 and 925 may correspond to a left viewpoint and a right viewpoint. In FIG. 9, candidate viewpoints include two viewpoints for a single user, however, there is no limitation thereto. Accordingly, the candidate viewpoints may include a preset number of viewpoints for multiple views. For example, when candidate viewpoints include a preset number of viewpoints for multiple views, the 3D image rendering apparatus may determine rays that pass through a pixel of a display panel and optical elements of an optical layer, and may assign a pixel value to a pixel based on directions of the rays and positions of optical images that correspond to the viewpoints. The preset number of viewpoints may be in fixed positions, unlike eyes of a user. Also, each of positions of the viewpoints may be specified by a representative position that is set in advance. The 3D image rendering apparatus may determine optical images associated with the viewpoints based on representative positions.

Figure 10:
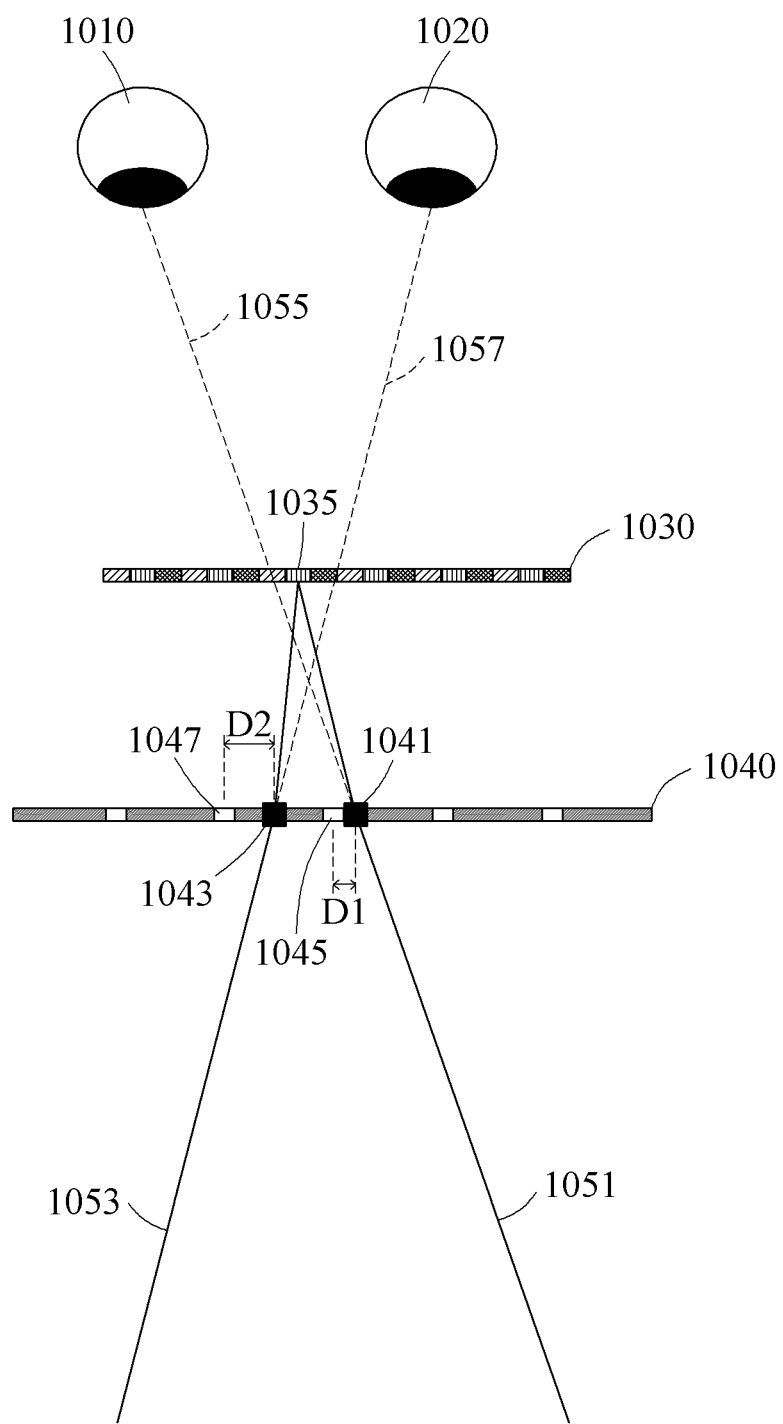
FIG. 10 is a diagram illustrating a process of assigning a viewpoint based on an intersection point between a virtual ray and an optical layer, according to an example embodiment.

FIG. 10 is a diagram illustrating a process of assigning a viewpoint based on an intersection point between a virtual ray and an optical layer, according to an example embodiment. In FIG. 10, virtual rays 1051 and 1053 pass through a pixel 1035 of a display panel 1030 and an optical layer 1040.

As described above, a 3D image rendering apparatus may indirectly determine a viewpoint that corresponds to a pixel based on a distance between optical elements and the virtual rays 1051 and 1053 that are based on optical images 1010 and 1020. An actual ray that passes through a pixel may pass through a central point of an optical element, however, the 3D image rendering apparatus may use a virtual candidate ray that passes through a predetermined pixel and a predetermined candidate view field.

The 3D image rendering apparatus may determine the optical images 1010 and 1020 based on candidate viewpoints, and may determine the virtual rays 1051 and 1053 based on the optical images 1010 and 1020. The 3D image rendering apparatus may determine the virtual rays 1051 and 1053 so that the optical images 1010 and 1020 may be located in directions opposite to refraction directions of the virtual rays 1051 and 1053. To determine the virtual rays 1051 and 1053, the 3D image rendering apparatus may use reference lines 1055 and 1057 drawn in directions opposite to the refraction directions of the virtual rays 1051 and 1053. For example, the 3D image rendering apparatus may determine the virtual rays 1051 and 1053 so that the reference lines 1055 and 1057 may intersect the optical images 1010 and 1020. The 3D image rendering apparatus may determine the virtual rays 1051 and 1053 based on a first refractive index of a medium that is disposed between the display panel 1030 and the optical layer 1040 and a second refractive index of a medium that is disposed outside a 3D display apparatus including the display panel 1030 and the optical layer 1040.

When the virtual rays 1051 and 1053 are determined, the 3D image rendering apparatus may determine an intersection point 1041 between the virtual ray 1051 and the optical layer 1040 and an intersection point 1043 between the virtual ray 1053 and the optical layer 1040. The 3D image rendering apparatus may determine the intersection points 1041 and 1043 based on an angle of incidence and an angle of refraction of each of the virtual rays 1051 and 1053 that are determined based on the first refractive index and the second refractive index. When the intersection points 1041 and 1043 are determined, the 3D image rendering apparatus may determine a viewpoint that corresponds to the pixel 1035 based on a distance D1 between the intersection point 1041 and an optical element 1045 of the optical layer 1040 and a distance D2 between the intersection point 1043 and an optical element 1047 of the optical layer 1040.

The 3D image rendering apparatus may determine the closest intersection point to a neighboring optical element between the intersection points 1041 and 1043, and may assign a pixel value of a viewpoint that corresponds to the determined intersection point to the pixel 1035. The neighboring optical element may refer to the closest optical element to an intersection point among optical elements of the optical layer 1040. For example, the optical element 1045 may correspond to a neighboring optical element of the intersection point 1041, and the optical element 1047 may correspond to a neighboring optical element of the intersection point 1043. When the distance D1 is less than the distance D2, the 3D image rendering apparatus may assign a pixel value of a viewpoint that corresponds to the optical image 1010 to the pixel 1035, because the pixel 1035 is highly likely to be observed by the virtual ray 1053 rather than an actual ray that is adjacent to the virtual ray 1054.

The optical images 1010 and 1020 may correspond to a left viewpoint and a right viewpoint. In FIG. 10, candidate viewpoints include two viewpoints for a single user, however, there is no limitation thereto. Accordingly, the candidate viewpoints may include a preset number of viewpoints for multiple views. For example, when candidate viewpoints include a preset number of viewpoints for multiple views, the 3D image rendering apparatus may determine virtual rays emitted to the viewpoints, and may assign a pixel value that corresponds to one of the viewpoints to a pixel based on a distance between an intersection point between each of the virtual rays and the optical layer and an optical element that is adjacent to the intersection point. The preset number of viewpoints may be in fixed positions, unlike eyes of a user. Also, each of positions of the viewpoints may be specified by a representative position that is set in advance. The 3D image rendering apparatus may determine optical images associated with the viewpoints based on representative positions.

Figure 11:
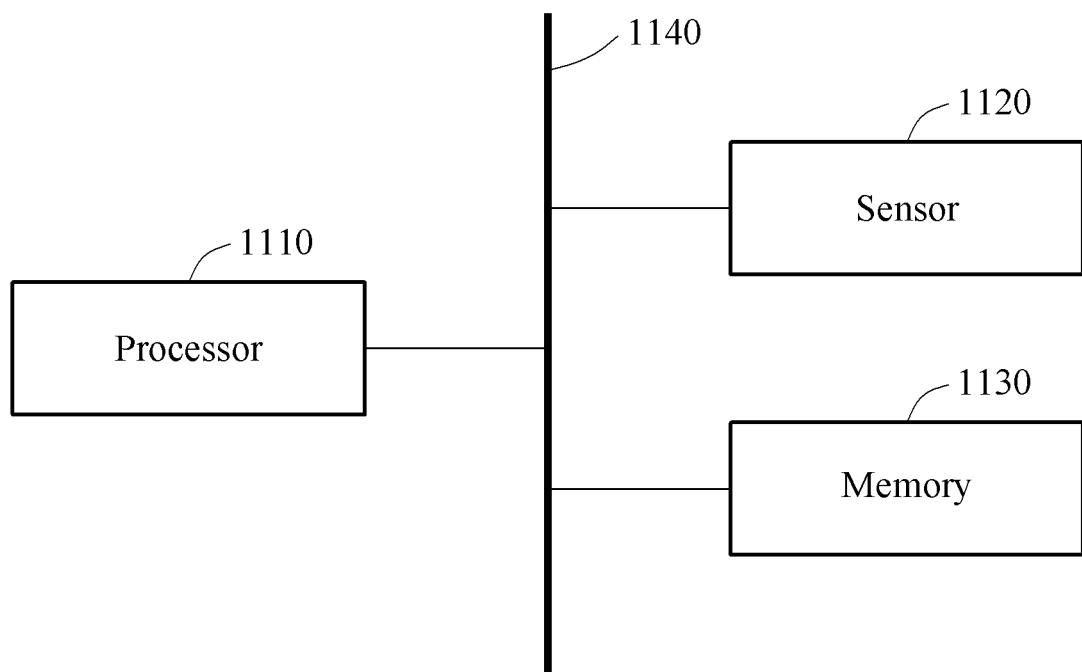
FIG. 11 is a block diagram illustrating a 3D image rendering apparatus, according to an example embodiment.

FIG. 11 is a block diagram illustrating a 3D image rendering apparatus, according to an example embodiment. Referring to FIG. 11, the 3D image rendering apparatus includes a processor 1110, a sensor 1120 and a memory 1130. The processor 1110, the sensor 1120 and the memory 1130 may communicate with each other via a bus 1140.

The sensor 1120 may detect or track eyes of a user. The sensor 1120 may include, for example, at least one from among an image sensor, a proximity sensor and/or an infrared sensor. The sensor 1120 may detect or track eyes of a user based on a well-known scheme, for example, a scheme of converting an optical image into an electrical signal. The sensor 1120 may transmit at least one from among a captured color image, a depth image and/or an infrared image to at least one of the processor 1110 or the memory 1130.

The processor 1110 may include at least one of the above-described apparatuses or may perform at least one of the above-described methods. For example, the processor 1110 may process the above-described operations associated with 3D image rendering.

The memory 1130 may store computer-readable instructions. When instructions stored in the memory 1130 are executed by the processor 1110, the processor 1110 may process operations associated with 3D image rendering. Also, the memory 1130 may store data associated with the above-described 3D image rendering.

The processor 1110 may execute instructions or programs, and/or may control the 3D image rendering apparatus. The 3D image rendering apparatus may be connected to an external device (for example, a personal computer (PC) or a network) via an input/output device (not shown), and may exchange data with the external device. The 3D image rendering apparatus may be implemented as at least a portion of, for example, a mobile device such as a mobile phone, a smartphone, a personal digital assistant (PDA), a tablet computer or a laptop computer, a computing device such as a PC or a netbook, and an electronic product such as a television (TV), a smart TV or a security device for gate control, and various electronic systems such as autonomous vehicles. Also, the 3D image rendering apparatus may be implemented as a portion of an HUD. The above description is also applicable to the 3D image rendering apparatus, and accordingly is not repeated here.

Figure 12:
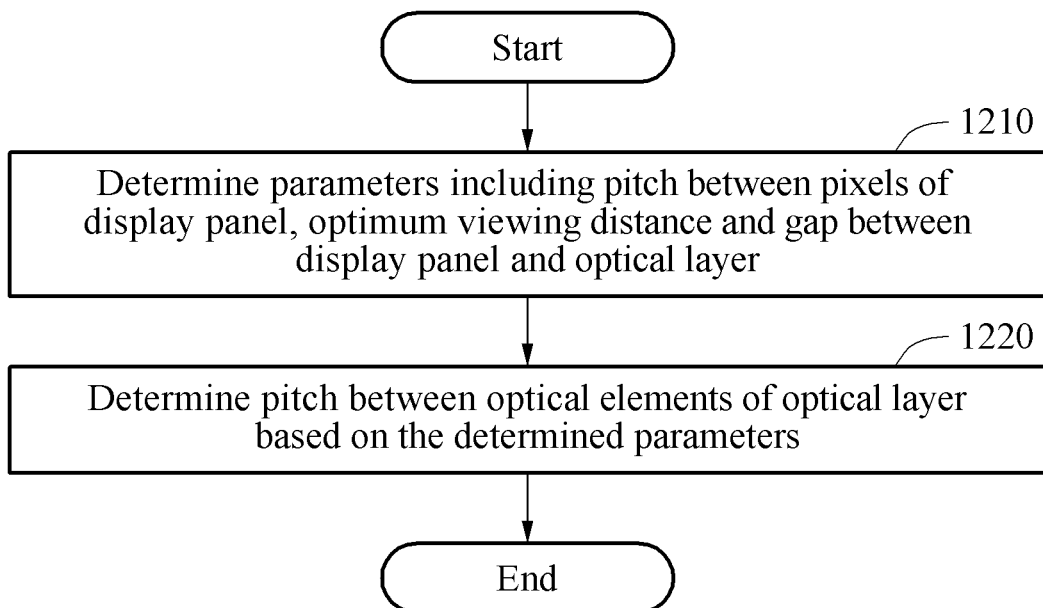
FIG. 12 is a flowchart illustrating a method for designing a 3D display apparatus, according to an example embodiment.

FIG. 12 is a flowchart illustrating a method for designing a 3D display apparatus, according to an example embodiment. Referring to FIG. 12, in operation 1210, a design apparatus determines parameters including a pitch between pixels of a display panel, an optimum viewing distance and a gap between the display panel and an optical layer. In operation 1220, the design apparatus determines a pitch between optical elements of the optical layer based on the determined parameters. The above description is also applicable to the method of FIG. 12, and accordingly is not repeated here.

The example embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as compact disk-read-only memory (CD ROM) discs and digital versatile disks (DVDs); magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

While the present disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner and/or replaced or supplemented by other components or their equivalents. Therefore, the scope of the present disclosure is defined not by the detailed description, but by the claims and their equivalents, and all variations within the scope of the claims and their equivalents are to be construed as being included in the present disclosure.

What is claimed is:

1. A three-dimensional (3D) display apparatus comprising:
    a display panel configured to output pixel values; and
    an optical layer provided in front of the display panel and configured to adjust respective directions of rays output from the display panel so that the rays diverge,
    wherein the display panel includes pixels, the optical layer includes optical elements, and a pitch between adjacent pairs of the optical elements of the optical layer is greater than a product of a number of pixels emitting rays to a single optical element of the optical layer and a pitch between adjacent pairs of the pixels of the display panel.

2. The 3D display apparatus of claim 1, wherein the pitch between the adjacent pairs of the optical elements of the optical layer is determined further based on a viewing distance and a gap between the display panel and the optical layer.

3. The 3D display apparatus of claim 2, wherein the viewing distance is determined based on a distance between the display panel and an optical image acquired by applying an optical transformation to a predetermined viewpoint of a user.

4. The 3D display apparatus of claim 1, wherein
a relationship between the pitch between the adjacent pairs of the optical elements of the optical layer, the number of pixels emitting rays to the single optical element of the optical layer, the pitch between the adjacent pairs of the pixels of the display panel, a viewing distance and a gap between the display panel and the optical layer is expressible based on the following equation:

$$\frac{P_{opt}}{NP_{pix}} = 1 + \frac{d_{gap}}{d_{view}}$$

wherein $P_{opt}$ denotes the pitch between the adjacent pairs of the optical elements, N denotes the number of pixels emitting rays to by the single optical element, $P_{pix}$ denotes the pitch between the adjacent pairs of the pixels, $d_{view}$ denotes the viewing distance, and $d_{gap}$ denotes the gap between the display panel and the optical layer.

5. The 3D display apparatus of claim 1, wherein the optical layer includes one from among a parallax barrier and a lenticular lens.

6. The 3D display apparatus of claim 1, wherein a 3D image rendered by the rays is observable by the catadioptric system.

7. The 3D display apparatus of claim 1, wherein the pixel values are determined based on an optical image acquired by applying an optical transformation to a predetermined viewpoint of a user.

8. A three-dimensional (3D) display apparatus comprising:
a display panel configured to output pixel values; and
an optical layer provided behind the display panel and configured to provide light to the display panel so that rays output from the display panel diverge,
wherein the display panel includes pixels, the optical layer includes optical elements, and a pitch between adjacent pairs of the optical elements of the optical layer is less than a product of a number of pixels emitting rays to a single optical element of the optical layer and a pitch between adjacent pairs of the pixels of the display panel.

9. The 3D display apparatus of claim 8, wherein the pitch between the adjacent pairs of the optical elements of the optical layer is determined further based on a viewing distance and a gap between the display panel and the optical layer.

10. The 3D display apparatus of claim 8, wherein a relationship between the pitch between the adjacent pairs of the optical elements of the optical layer, the number of pixels emitting rays to the single optical element of the optical layer, the pitch between the adjacent pairs of the pixels of the display panel, a viewing distance and a gap between the display panel and the optical layer is expressible based on the following equation:

$$\frac{P_{opt}}{NP_{pix}} = 1 - \frac{d_{gap}}{d_{view}}$$

wherein $P_{opt}$ denotes the pitch between the adjacent pairs of the optical elements, N denotes the number of pixels emitting rays to the single optical element, $P_{pix}$ denotes the pitch between the adjacent pairs of the pixels, $d_{view}$ denotes the viewing distance, and $d_{gap}$ denotes the gap between the display panel and the optical layer.

11. The 3D display apparatus of claim 8, wherein the optical layer is implemented as a directional backlight device.

12. The 3D display apparatus of claim 8, wherein a 3D image rendered by the rays is observable by the catadioptric system.

13. The 3D display apparatus of claim 8, wherein the pixel values are determined based on an optical image acquired by applying an optical transformation to a predetermined viewpoint of a user.

14. A method for designing a three-dimensional (3D) display apparatus including a display panel and an optical layer, the method comprising:
determining parameters comprising a pitch between adjacent pairs of pixels of the display panel, an optical viewing distance, and a gap between the display panel and the optical layer; and
determining a pitch between adjacent pairs of optical elements of the optical layer based on the determined parameters,
wherein when the optical layer is provided in front of the display panel, the pitch between the adjacent pairs of the optical elements is determined to be greater than a product of a number of pixels emitting rays to a single optical element of the optical layer and the pitch between the adjacent pairs of the pixels of the display panel, and
wherein when the optical layer is provided behind the display panel, the pitch between the adjacent pairs of the optical elements is determined to be less than a product of the number of pixels emitting rays to the single optical element of the optical layer and the pitch between the adjacent pairs of the pixels of the display panel.

15. The method of claim 14, wherein the determining the pitch between the adjacent pairs of the optical elements comprises:
adjusting at least one of the determined parameters when the determining the pitch between the adjacent pairs of the optical elements based on the determined parameters is determined to be infeasible; and
determining the pitch between the adjacent pairs of the optical elements based on the determined parameters and the at least one adjusted parameter.

16. The method of claim 14, wherein the optical viewing distance is determined based on a distance between the display panel and an optical image acquired by applying an optical transformation to a predetermined viewpoint of a user.

17. A non-transitory computer-readable medium storing instructions that, when executed by a processor, cause the processor to perform the method of claim 14.

* * * * *